United States Patent
Srivastava et al.

(10) Patent No.: US 9,152,207 B2
(45) Date of Patent: Oct. 6, 2015

(54) SYSTEM FOR REDUCING DYNAMIC POWER CONSUMPTION OF WAKEUP SOURCE

(75) Inventors: Gur Prasad Srivastava, Agra (IN); Parampreet Singh Baweja, Chandigarh (IN); Rohit Gupta, Panchkula (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 462 days.

(21) Appl. No.: 13/530,095

(22) Filed: Jun. 21, 2012

(65) Prior Publication Data

US 2013/0346775 A1   Dec. 26, 2013

(51) Int. Cl.
*G06F 1/00* (2006.01)
*G06F 1/32* (2006.01)
*G06F 1/26* (2006.01)
*H04L 29/06* (2006.01)
*H04W 52/02* (2009.01)

(52) U.S. Cl.
CPC ............ *G06F 1/3215* (2013.01); *G06F 1/3237* (2013.01); *G06F 1/26* (2013.01); *G06F 1/32* (2013.01); *G06F 1/3278* (2013.01); *G06F 2213/0038* (2013.01); *H04L 63/0414* (2013.01); *H04L 63/08* (2013.01); *H04L 63/1416* (2013.01); *H04W 52/0225* (2013.01); *Y02B 60/1221* (2013.01)

(58) Field of Classification Search
CPC . H04L 63/0414; H04L 63/08; H04L 63/1416; G06F 1/32; G06F 1/3278; G06F 1/3287; G06F 1/26; G06F 2213/0038; H04W 52/0225
USPC .......................................................... 713/323
See application file for complete search history.

(56) References Cited

U.S. PATENT DOCUMENTS

| | | |
|---|---|---|
| 5,802,305 A | 9/1998 | McKaughan |
| 6,463,542 B1 | 10/2002 | Yu |
| 6,782,484 B2 | 8/2004 | McGowan |
| 7,127,521 B2 | 10/2006 | Hsu |
| 7,327,754 B2 | 2/2008 | Mills |

(Continued)

OTHER PUBLICATIONS

"Newest Freescale QorIQ processor delivers performance and energy efficiency for green embedded applications", Electronic Specifier, http://www.electronicspecifier.com, Sep. 9, 2009.

(Continued)

*Primary Examiner* — Jaweed A Abbaszadeh
*Assistant Examiner* — Xuxing Chen
(74) *Attorney, Agent, or Firm* — Charles Bergere

(57) ABSTRACT

A system for reducing dynamic power consumption of a wakeup source includes a receiver interface coupled to the wakeup source. A data packet, received by the receiver interface, transmits the data packet to the wakeup source. The wakeup source processes the data packet to identify a predetermined code for initiating a wakeup sequence. The wakeup source is put into a deep sleep mode if it is idle for a predetermined time period.

9 Claims, 2 Drawing Sheets

(56) References Cited

U.S. PATENT DOCUMENTS

| | | |
|---|---|---|
| 7,603,574 B1 | 10/2009 | Gyugyi |
| 2003/0061426 A1 | 3/2003 | Connor |
| 2003/0191854 A1 | 10/2003 | Hsu |
| 2004/0196789 A1 | 10/2004 | Keirouz |
| 2004/0264396 A1 | 12/2004 | Ginzburg |
| 2005/0097378 A1* | 5/2005 | Hwang ........................ 713/320 |
| 2005/0188232 A1* | 8/2005 | Weng et al. .................. 713/320 |
| 2007/0238437 A1 | 10/2007 | Jaakkola |
| 2010/0115302 A1* | 5/2010 | Cho et al. ..................... 713/310 |
| 2011/0213992 A1 | 9/2011 | Satsangi |
| 2012/0311362 A1* | 12/2012 | Sawada ........................ 713/323 |
| 2014/0032955 A1* | 1/2014 | Boelter ........................ 713/323 |

OTHER PUBLICATIONS

"P1022 Product Summary Page", www.freescale.com/webapp/sps/site/prod_summary.jsp?code=P1022, downloaded on Feb. 11, 2010.

"Advanced PowerQUICC III SoC from Freescale sets new standards for energy efficiency in embedded processing", Power.ORG, http://www.power.org, Sep. 10, 2008.

* cited by examiner

SYSTEM FOR REDUCING DYNAMIC POWER CONSUMPTION OF WAKEUP SOURCE

BACKGROUND OF THE INVENTION

The present invention relates generally to electronic circuits, and, more particularly, to a system for reducing dynamic power consumption of a wakeup source in an electronic circuit.

In an effort to render consumer electronic products more energy efficient, various standards including Energy Star have been proposed for certifying the consumer electronic products based on their energy efficiency. To comply with such standards, peripheral devices, such as printers, are required to consume less power than that set by the standard. Peripheral devices are designed with innovative features to reduce power consumption and meet the requirements of the standard. For example, a printer includes a sleep mode or a hibernation mode in which the device is powered down if it is inactive for a predetermined time period, which substantially reduces power consumption. The device wakes up from the sleep/hibernation mode when any activity such as pressing the power button is sensed. Such devices include a wakeup source that wakes up the device from the sleep/hibernation mode. The wakeup source scans various data packets received from an external source to identify a predetermined code. If a data packet includes the predetermined code, the wakeup source initiates a wakeup sequence to wake up the device. If the predetermined code is not detected, the wakeup source continues to scan for other data packets.

Since the wakeup source continuously scans the received data packets, it has to be kept powered ON. Powering down the wakeup source may lead to loss of data packets that may cause the peripheral device to malfunction. On the other hand, a continuously powered wakeup source consumes substantial power, which increases the overall power consumption of the device.

Therefore, it would be advantageous to have a wakeup source with low dynamic power consumption and that overcomes the above-mentioned limitations of conventional wakeup sources.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
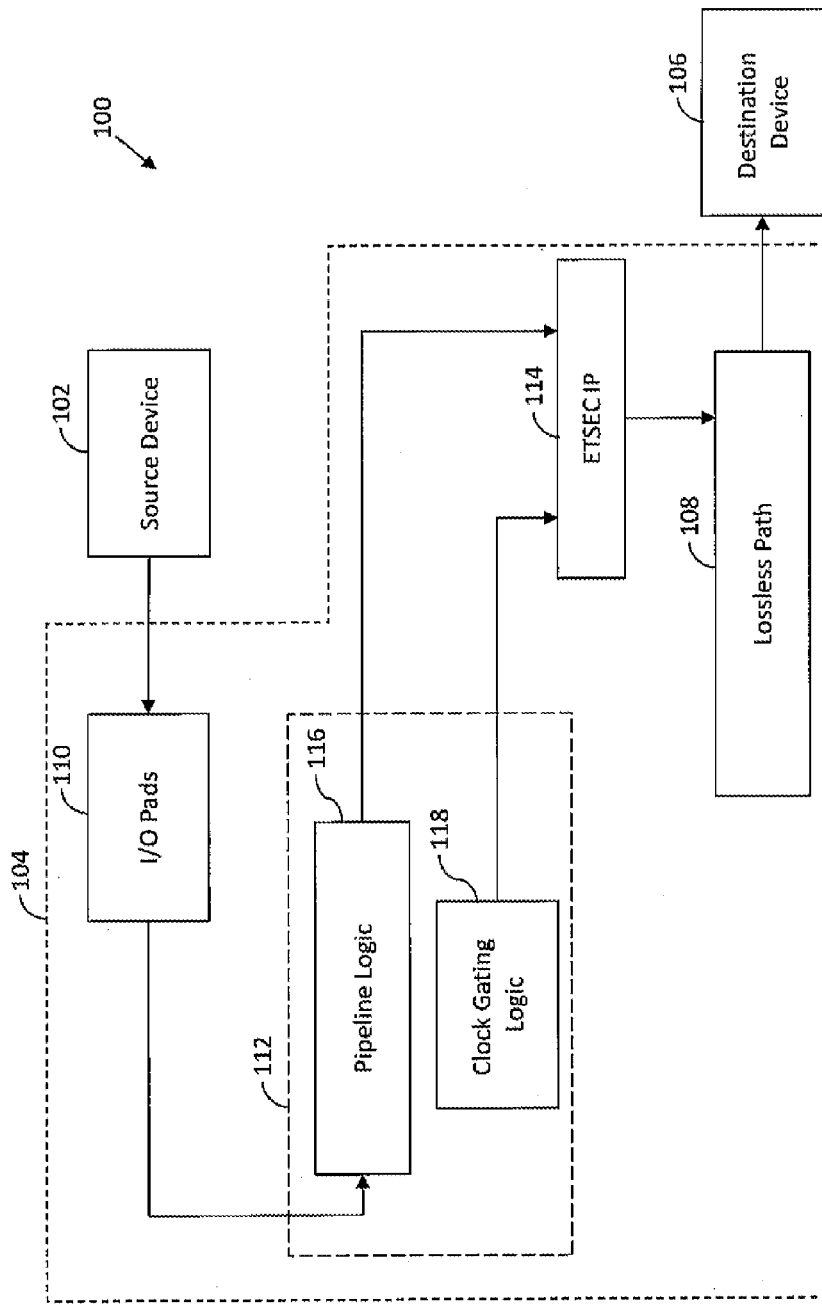
FIG. 1 is a schematic diagram depicting a system for receiving and transmitting a data packet in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for receiving a data packet from a source device and transmitting the data packet to a destination device is provided. The system includes an input/output (I/O) pad for receiving the data packet from the source device. The system further includes a wakeup source, coupled to the I/O pad, for processing the data packet. The wakeup source initiates a wakeup sequence when the data packet includes a predetermined code and transmits the data packet to the destination device. Additionally, the system includes a clock gating logic, coupled to the wakeup source, which switches on the wakeup source when the I/O pad receives the data packet and switches off the wakeup source when the I/O pad is idle for a first predetermined time period.

In another embodiment of the present invention, a system for enabling communication between a source device and a destination device is provided. The system includes an input/output (I/O) pad for receiving a data packet from the source device. The system further includes a wakeup source, coupled to the I/O pad, for processing the data packet. The wakeup source initiates a wakeup sequence when the data packet includes a predetermined code and transmits the data packet to the destination device. Further, the system includes a clock gating logic, coupled to the wakeup source, which switches on the wakeup source when the I/O pad receives the data packet and switches off the wakeup source when the I/O pad is idle for a first predetermined time period. The system further includes a buffer circuit, coupled to the I/O pad and the wakeup source, for delaying transmission of the data packet to the wakeup source by a second predetermined time period.

In yet another embodiment of the present invention, a method for reducing dynamic power consumption of a wakeup source in a deep sleep mode, is provided. The wakeup source processes a data packet during transmission from a source device to a destination device. The data packet is received by an input/output (I/O) pad coupled to the wakeup source. A clock signal provided to the wakeup source is enabled when the data packet is received and the data packet is processed by the wakeup source to identify a predetermined code embedded in the data packet. Further, the clock signal is gated when the I/O pad is idle for a first predetermined time period.

Various embodiments of the present invention provide a system and method for reducing dynamic power consumption of a wakeup source in a deep sleep mode. A data packet is received by an I/O pad of a system-on-a-chip (SoC) which transmits the data packet to a receiver interface. The receiver interface is coupled to a wakeup source that is in a deep sleep mode when the data packet is received. The receiver interface includes a pipeline logic and a clock gating logic. The pipeline logic delays the transmission of the data packet by a first predetermined time period and the clock gating logic enables a clock signal to the wakeup source, when the data packet is received. As a result, the wakeup source wakes up from the deep sleep mode and becomes ready for processing the data packet. The pipeline logic is configured to delay the transmission of the data packet by a time period that is equal to or greater than the time required by the wakeup source to be completely powered up and ready for processing. Thus, by the time the data packet reaches the wakeup source, the wakeup source is completely switched on and begins to process the data packet. The waking up of the wakeup source prior to receiving the data packet prevents loss of the data packet even when the wakeup source is initially in the deep sleep mode. Thus, by putting the wakeup source in deep sleep mode, the dynamic power consumption is substantially reduced. The reduction in the power consumption of the wakeup source also lowers the power consumption of the SoC. Further, delaying the transmission of the data packet ensures that data packets carrying critical information are not lost.

Referring now to FIG. 1, a schematic diagram depicting a system 100 for receiving and transmitting a data packet, in accordance with an embodiment of the present invention, is shown. The system 100 includes a source device 102, a system-on-chip (SoC) 104, and a destination device 106. The SoC 104 includes a lossless path 108, a plurality of input/output (I/O) pads 110, a receiver interface 112, and a wakeup source 114. The receiver interface 112 includes a pipeline logic 116, and a clock gating logic 118.

The source device 102 transmits one or more data packets to the SoC 104 that are received by the I/O pads 110. In an embodiment of the present invention the SoC 104 may be a microprocessor, a microcontroller unit (MCU), and an application specific integrated circuit (ASIC) that is used to interface the source device 102 with the destination device 106. The SoC 104 may be used in a peripheral device including a printer, a display unit, and an image scanner. The source device 102 may be a data packet originator that includes at least one of an Ethernet transmitter and a universal serial bus (USB) device. The I/O pads 110 transmit the received data packets to the receiver interface 112. The data packets traverse through the pipeline logic 116 and reach the wakeup source 114. In an embodiment of the present invention, the wakeup source 114 may be at least one of an Ethernet controller (ETSEC IP) and a USB controller. The pipeline logic 116 includes a series of buffer circuits that delay transmission of the data packets. The wakeup source 114 processes the data packets to identify a predetermined code embedded in the data packets. In an example, the predetermined code is a sequence of binary values indicating that a wakeup sequence should be initiated for waking up the lossless path 108. In another example, the predetermined code is a sequence of hexadecimal values indicating that the wakeup sequence should be initiated for waking up the lossless path 108. The wakeup source 114 initiates the wakeup sequence when a data packet includes the predetermined code. The wakeup sequence wakes up the lossless path 108 that connects the wakeup source 114 to the destination device 106. In an embodiment of the present invention, the lossless path 108 is a data path that allows the transmission of data packets. The waking up of the lossless path 108 enables the transmission of the data packet and any subsequently received data packets to the destination device 106. In an embodiment of the present invention, the destination device 106 may be a memory device that includes at least one of a double data rate (DDR) memory, a FLASH memory, and an internal synchronous random access memory (SRAM) and the lossless path 108 may include gaskets and a system bus connecting to the memory device. The data packet and any data packets received subsequent to the waking up of the lossless path 108 are stored in the destination device 106. Further, the clock gating logic 118 switches off the wakeup source 114 when the I/O pads 110 are idle, i.e., when the I/O pads 110 do not receive any data packet for a predetermined time period. This reduces the dynamic power consumption of the wakeup source 114.

Figure 2:
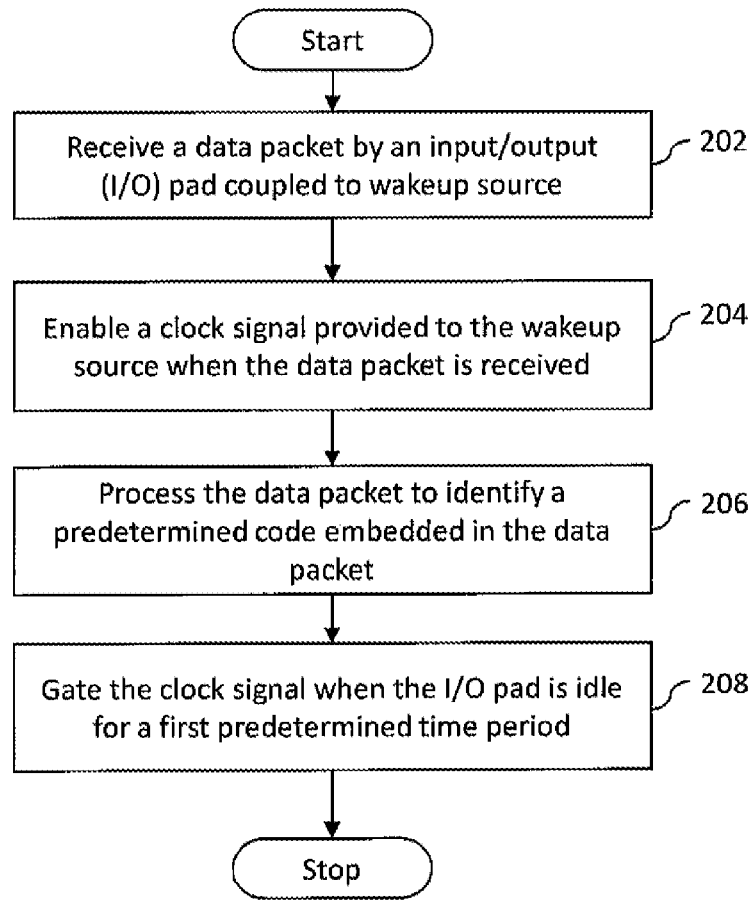
FIG. 2 is a flowchart depicting a method for reducing dynamic power consumption of a wakeup source in accordance with an embodiment of the present invention.

Referring now to FIG. 2, a flowchart 200 depicting a method for reducing dynamic power consumption of a wakeup source, in accordance with an embodiment of the present invention, is shown. FIG. 2 is explained in detail in conjunction with FIG. 1.

At step 202, a data packet is received by the I/O pads 110 associated with the SoC 104. The I/O pads 110 transmit the data packet to the receiver interface 112 that is coupled to the wakeup source 114. The wakeup source 114 is at least one of an Ethernet controller (ETSEC IP) and a USB controller and is in a deep sleep mode when the data packet is received. During the deep sleep mode, a clock signal (not shown) to the wakeup source 114 is gated by the clock gating logic 118. Gating the clock signal reduces the dynamic power consumption of the wakeup source 114 and substantially reducing the power consumption of the SoC 104. The data packet traverses the pipeline logic 116 that delays the transmission of the data packet by a first predetermined time period. The pipeline logic 116 may include a series of buffer circuits (not shown). The first predetermined time period is equal to or greater than the time required by the wakeup source 114 to wake up from deep sleep mode, for processing the received data packet.

At step 204, the clock signal provided to the wakeup source 114 is enabled by the clock gating logic 118. As a result, the wakeup source 114 wakes up from the deep sleep mode and prepares to process the data packet. Since the transmission of the data packet is delayed by the first predetermined time period, the wakeup source 114 is ready for processing by the time the data packet arrives, which prevents loss of the data packet. At step 206, the wakeup source 114 processes the data packet. After processing, the wakeup source 114 identifies a predetermined code embedded in the data packet and initiates a wakeup sequence. The wakeup sequence wakes up the lossless path 108 that leads to the destination device 106. In an embodiment of the present invention, the lossless path 108 is a data path that allows the transmission of data packets. The waking up of the lossless path 108 enables the transmission of the data packet and any subsequently received data packets, to the destination device 106. The data packet and any data packets received subsequent to the waking up of the lossless path 108 are stored in the destination device 106. If the data packet does not include the predetermined code, the wakeup source 114 does not initiate the wakeup sequence. After a second predetermined time period, if the I/O pads 110 remain idle, the lossless path 108 is put into the deep sleep mode.

At step 208, the clock signal to the wakeup source 114 is gated by the clock gating logic 118 if the I/O pads 110 do not receive any data packet from the source device 102 for a third predetermined time period after the lossless path 108 is put into the deep sleep mode.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for receiving a data packet from a source device and transmitting the data packet to a destination device, comprising:

an input/output (I/O) pad for receiving the data packet from the source device;

a wakeup source, coupled to the I/O pad, for processing the data packet, wherein the wakeup source initiates a wakeup sequence when the data packet includes a predetermined code, and transmits the data packet to the destination device;

clock gating logic, coupled to the wakeup source, for switching on the wakeup source when the I/O pad receives the data packet and switching off the wakeup source when the I/O pad is idle for a first predetermined time period; and at least one buffer circuit, coupled between the I/O pad and the wakeup source, for delaying transmission of the data packet to the wakeup source by a second predetermined time period, wherein the wakeup source is switched on within the second predetermined time period.

2. The system of claim 1, wherein the source device is a data packet originator and the destination device is an external memory.

3. The system of claim 1, wherein the source device is at least one of an Ethernet transmitter and Universal Serial Bus (USB) device.

4. The system of claim 1, wherein the destination device is at least one of a double data rate (DDR) memory, FLASH memory, and internal synchronous random access memory (SRAM).

5. The system of claim 1, wherein the wakeup source is at least one of Ethernet controller and USB controller that receives the data packet from the source device.

6. The system of claim 5, wherein the wakeup sequence switches on a data path to the destination device.

7. The system of claim 1, wherein the clock gating logic enables a clock signal provided to the wakeup source for switching on the wakeup source.

8. The system of claim 7, wherein the clock gating logic gates the clock signal provided to the wakeup source for switching off the wakeup source.

9. A method for reducing dynamic power consumption of a wakeup source in a deep sleep mode, wherein the wakeup source processes a data packet during transmission of the data packet from a source device to a destination device, the method comprising:
   receiving the data packet at an input/output (I/O) pad coupled to the wakeup source;
   enabling a dock signal provided to the wakeup source when the data packet is received at the I/O pad;
   delaying the transmission of the data packet to the wakeup source by a second predetermined time period;
   switching on the wakeup source within the second predetermined time period;
   processing the data packet by the wakeup source to detect a predetermined code embedded in the data packet; and
   gating the dock signal when the I/O pad is idle for a first predetermined time period.

* * * * *